United States Patent [19]

Faber

[11] Patent Number: 5,371,211

[45] Date of Patent: Dec. 6, 1994

[54] CELLULOSE ESTERS AND SALTS THEREOF

[75] Inventor: Jan W. H. Faber, Oranjestad, Netherlands

[73] Assignee: Eastman Kodak Company, Rochester, N.Y.

[21] Appl. No.: 623,143

[22] Filed: Dec. 4, 1990

[51] Int. Cl.$^5$ .......................... C08B 3/16; C08B 3/22
[52] U.S. Cl. ....................... 536/63; 536/64; 536/76; 536/124
[58] Field of Search .............. 536/56, 63, 76, 64, 536/69, 124

[56] References Cited

U.S. PATENT DOCUMENTS

| | | | |
|---|---|---|---|
| 2,310,729 | 2/1943 | Bley | 536/58 |
| 2,856,400 | 10/1958 | Malm | 536/64 |
| 3,950,282 | 4/1976 | Gilbert et al. | 524/461 |
| 4,264,692 | 4/1981 | Held | 430/17 |
| 4,405,324 | 9/1983 | Cruz, Jr. | 536/60 |
| 4,459,352 | 7/1984 | Jones et al. | 430/539 |
| 4,734,239 | 3/1988 | Diamantoglou et al. | 536/63 |
| 4,795,641 | 1/1989 | Kashdan | 424/488 |

OTHER PUBLICATIONS

Mark et al. "Cellulose and Cellulose Derivatives" (1971), vol. 5, part IV, pp. 484–485.
Kodak Laboratory Chemicals, Catalogue number 54, product literature of Kodak, pp. 156–159 (Dec. 1990).
Manley, J. of Polymer Science: Part A vol. 1, pp. 1893–1899 (1963).
Wadehra et al., J. of Applied Polymer Science, vol. 9, pp. 2627–2630 (1965).
Sisson, Industrial and Engineering Chemistry, vol. 30, IV. 5, pp. 530–537.
Jeffries, Journal of Applied Polymer Science 12, pp. 425–445 (1968).

*Primary Examiner*—John Kight, III
*Assistant Examiner*—Jeffrey Culpper Mullis
*Attorney, Agent, or Firm*—Robert A. Gerlach

[57] ABSTRACT

Cellulose esters of polycarboxylic acids, and their salts, such as the hydrogen cellulose ester of succinic acid, and the potassium salts thereof, are known to be useful in the preparation of conductive layers in composite such as photographic films. This invention comprises the discovery that such esters and salts provide improved conductive layers, if made from amorphous cellulose obtained by deacylating a material (such as cellulose acetate) using a lower alcohol as the deacylating agent, and an alkali metal alkoxide as the catalyst. Thus, the conductivity of potassium cellulose succinate (KCS) is improved, if made from a cellulose produced as described above. Furthermore, gelatin/KCS coating solutions made from improved KCS coating solutions of this invention have lower viscosities; this makes them much more suitable for roll coating, a support to be coated such as by a skim pan—air knife technique.

5 Claims, No Drawings

CELLULOSE ESTERS AND SALTS THEREOF

CROSS-REFERENCE TO RELATED APPLICATION

This application is related to application Ser. No. 623,149 filed Dec. 4, 1990, for "Conductive Coating Composition and Composite Bases and Elements Containing Same", by R. T. Jones and C. W. Hannon.

FIELD OF THE INVENTION

This invention relates to improved polycarboxylic acid esters of cellulose, such as the cellulose ester of succinic acid. This invention also relates to salts of such esters; particularly to alkali metal salts; e.g. salts of sodium or potassium. The improved compositions of this invention are made by a process which comprises deacylating a cellulose ester of a fatty acid, e.g. cellulose acetate, using an alcohol/alkali metal alkoxide mixture (e.g. methanol/sodium methoxide) as the deacylating agent.

BACKGROUND OF THE INVENTION

U.S. Pat. No. 4,459,352 discloses aqueous coating compositions for forming conductive layers in composite bases or elements, particularly photographic elements having hydrophobic supports. The coating compositions therein described are comprised of (i) an ester of cellulose having at least 8 acyl groups per $C_{24}$ cellulose unit, wherein at least a majority of the acyl units are derived from an aliphatic carboxylic acid having from 3 to 6 carbon atoms, or (ii) a salt of such an ester.

This invention relates to an improvement of the invention of U.S. Pat. No. 4,459,352. More specifically, this invention relates to improved esters and salts of the type defined above. Specifically, such esters and salts are made from a cellulose derived (a) from an acylated cellulose starting material such as cellulose acetate, by (b) conducting the deacylation reaction using an alkali metal alkoxide as a catalyst, and an alcohol as the deacylative reagent. Preferably, the reaction is conducted using methanol and sodium methoxide.

It is known that cellulose acetate can be deacylated in this manner, see Research Disclosure No. 176, 17624 (December 1978); U.S. Pat. No. 3,950,282 see column 10, lines 55–60, Manley, *J. of Polymer Science*: Part A, Vol 1, pp 1893–1899 (1963); Wadehra et al, *J. of Applied Polymer Science*, vol 9, pp 2627–2630 (1965); Sisson, *Industrial and Engineering Chemistry*, 30, No. 5 pp 530–537, (may 1938), and Jeffries, *J. of Applied Polymer Science*, Vol 12, pp 425–445 (1963).

None of these references relate to the hydrogen cellulose esters or the salts thereof that are provided by this invention.

SUMMARY OF THE INVENTION

This invention relates to cellulose esters of aliphatic polycarboxylic acids having 3 to 6 carbon atoms, and alkali metal salts thereof, which are derived from deacylated cellulose esters of a lower fatty acid. These esters and salts are produced by reacting an ester of a lower fatty acid with an alcohol in the presence of an alkoxide. Thus, for example, this invention relates to a potassium cellulose succinate that is (a) produced from a cellulose derived from a cellulose acetate having a degree of polymerization of 75–180, and (b) by deacetylating a cellulose acetate having a similar degree of polymerization using methanol and sodium methoxide as the deacylating agent.

A very active cellulose is made by the process described herein. Moreover, in contrast to cellulose made by an aqueous hydrolysis media, cellulose made by the process described herein can be dried and stored dry without significant degradation of activity. Furthermore, the amorphous cellulose made by the method described herein is much more reactive with anhydrides and acrylonitrile than virgin cellulose or cellulose made by a deacetylation using aqueous base. Furthermore, the process utilized reduces the deacylation time, the number of washes, and the esterification time. The latter result apparently diminishes the amount of backbone degradation. Moreover, potassium cellulose succinate of this invention has a higher conductivity. It also affords a lower viscosity coating composition when admixed with a hydrophilic agent such as gelatin. Thus, the esters and salts of this invention are readily adaptable by industry, and believed to comprise a significant advance in the art.

DESCRIPTION OF PREFERRED EMBODIMENTS

In a preferred embodiment, this invention is directed to a cellulose ester of a polycarboxylic acid, said acid having from 3 to 6 carbon atoms, said ester (a) having at least about 8 acyl groups per $C_{24}$ cellulose unit, (b) having an inherent viscosity of from about 0.7 to about 1.0 dL/g, and (c) having been formed from a cellulose having a weight average molecular weight of from about 12,000 to about 30,000, and obtained by deacylating a cellulose ester of a lower fatty acid with a lower alcohol in the presence of an alkali metal alkoxide catalyst. The inherent viscosity measured at 0.5% weight per volume in 1N sodium acetate in glacial acetic acid, at 25° C.

In another preferred embodiment, this invention relates to salts of the esters described above.

The salts and esters of this invention are preferably derivatives of cellulose having a weight average molecular weight of from about 12,000 to about 30,000. Cellulose compositions of this type are not readily available commercially. Hence, for this invention the desired cellulose starting material is conveniently made by deacylating an acylated cellulose having an appropriate molecular weight, such as an acetylated cellulose.

Cellulose acetate of the required molecular weight is available on a commercial scale, and accordingly, it is preferentially employed as a starting material to prepare the cellulose compositions of this invention. However, a skilled practitioner will recognize that the use of cellulose acetate is not a critical requirement of the invention and other similar acylated celluloses can be employed as the source for the cellulose used in this invention. Thus for example, the cellulose employed in this invention can be made by the deacylation of cellulose esters of a monocarboxylic fatty acid such as cellulose esters of fatty acids having up to about ten carbon atoms in the fatty acid group.

For the purposes of this invention, such derivatives of cellulose are deacylated by an alcohol in the presence of a catalyst. The alcohol employed as a deacylating agent is preferably an alcohol having up to about four carbon atoms. Of these alcohols, ethanol and methanol are preferred. The alcohol is employed in an amount sufficient to deacylate all of the acyl groups bonded to the cellulose moiety. It is not necessary that the amount of alcohol be limited to the stoichiometric amount. In fact, it is preferred that the alcohol be used in a molar excess so that it not only serves as reactant but also as a reaction medium. There is no real upper limit on the amount of alcohol that can be added to the reaction zone; this being defined by such secondary considerations as the size of the reaction vessel, economics, etc. Generally speaking, the amount of alcohol is from about 3 to about 250 moles, per each one mole portion of a cellulose fatty acid ester that has about three acyl groups per six-membered glucose ring in the cellulose. The excess of alcohol helps 'push' the reaction to the desired result by the Law of Mass Action, and also serves as a reaction medium facilitating contact between the catalyst and the fatty acid ester of cellulose. It is to be understood that if desired, the alcohol/alkoxide mixture may be incorporated in a non-aqueous solvent in which the alcohol and alkoxide are sufficiently soluble, e.g. esters, ethers, and the like.

Although not bound by any theory, it is believed that the process can be described in terms of two steps, as illustrated by the following discussion pertaining to the transformation of cellulose acetate into cellulose using methanol as a reactant and sodium methoxide as a catalyst. First, an acetoxy group

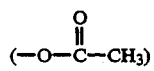

group reacts with a molecule of sodium methoxide to form methyl acetate and a sodium derivative of cellulose having the functionality —O—Na. Next, a molecule of methanol reacts to replace the sodium atom with hydrogen, and the CH$_3$O-fragment produced thereby reacts with the sodium to regenerate a molecule of sodium methoxide. Such a process is repeated for all of the acetoxy (or analogous) groups that are displaced.

Thus, for example, for a cellulose acetate having three acetoxy groups per each C$_6$ cellulose fragment, three molecules of methanol will be involved in the preparation of cellulose. Three molecules of sodium methoxide will be involved in the transformation, but each reaction will involve regeneration of the methoxide consumed; hence there will be no net change in the amount of sodium methoxide.

However, generally speaking the rate of the transformation will be dependent at least to some extent on the amount of alkali metal alkoxide present up until a maximum rate of reaction is obtained. Thus, for example, for a four hour reaction time and a reaction temperature equal to the reflux temperature for methanol, good results are obtained for each 500 g portion of cellulose acetate, one employs between 20 and 33 grams of 25% sodium methoxide in methanol. When 20 g of the sodium methoxide solution are used, the reaction rate will be somewhat less than that obtained with the larger amounts of methoxide. In one series of experiments, it appears that 32 g of the 25% methoxide solution appeared to give complete deacetylation in four hours.

As shown by the Examples which follow, good results were achieved when 25 g of the 25% solution were employed. Greater or lesser amounts can be used.

As indicated above, the deacylation rate is somewhat dependent on temperature. Higher temperatures generally give faster rates. A convenient reaction temperature is the reflux temperature of the alcohol. However greater or lesser temperatures can be employed. If a greater temperature is employed, one uses a pressure vessel and higher than ambient pressure. However ambient pressure is preferred. A preferred temperature range is from about 50° C. to the (normal) reflux temperature of the alcohol.

It is not necessary for the purpose of this invention for every fatty acid residue to be removed from the fatty acid-cellulose ester. Thus, good results are achieved when 90% or more of the acetyl groups are removed.

The product cellulose obtained by the deacylation reaction is readily obtained from the product slurry by filtration. The filter cake obtained can be washed with additional portions of alcohol, and dried if desired. The drying is preferably conducted at partial vacuum and at a temperature between about 20° C. and 45° C. Use of lower temperatures can unduly prolong the drying time, while higher temperatures can have an adverse effect on the reactivity of the cellulose.

With regard to the deacylation reaction:

(a) As indicated above, the amount of sodium alkoxide can determine the degree of deacylation for any set of reaction conditions (temperature and time) selected;

(b) Although the cellulose obtained can be stored in the dry state, reactivity of the cellulose can be adversely affected by reaction temperature and time; thus if the cellulose is to be stored, it is preferred to store it in a cold room (2° C.) or at a lower temperature for not more than about 90 days.

Cellulose esters of this invention are prepared by reacting cellulose produced as described above to give a polycarboxylic acid ester of cellulose. In these esters at least about 50% and more preferably about 90% of the acid acyl group presents at least one free unesterified carboxylic acid group.

Useful polycarboxylic acids (or acid halides or anhydride equivalents) for preparing the described esters include both aliphatic saturated and aliphatic unsaturated polycarboxylic acids having at least two carboxyl group. Preferably, aliphatic saturated acids having only two carboxyl groups (i.e. dicarboxylic acids) are used. Examples of useful polycarboxylic acids include phthalic acid, terephthalic acid, malonic acid, succinic acid, glutaric acid, fumaric acid, glutaconic acid, 2-methylsuccinic acid, adipic acid, 1,2,3-propanetricarboxylic acid, trimellitic acid, and the like. Preferred acids include dicarboxylic acids having from 3 to 6 carbon atoms, such as succinic acid, malonic acid, and glutaric acid. A particularly useful polycarboxylic acid is succinic acid. Anhydrides are preferred reactants.

To obtain the corresponding ester salts, one reacts the ester with a suitable hydroxide or equivalent (e.g. a bicarbonate) such as lithium, sodium, potassium or ammonium hydroxide or bicarbonate. The polycarboxylic acid ester of cellulose can be titrated with the basic material employed to produce the salt.

In a preferred embodiment the esters or salts have at least 8 acyl groups per C$_{24}$ cellulose unit wherein at least a majority of the acyl groups are derived from an aliphatic polycarboxylic acid having from 3 to 6 carbon atoms. The esters can be represented by the following formula of a C$_{24}$ cellulose unit:

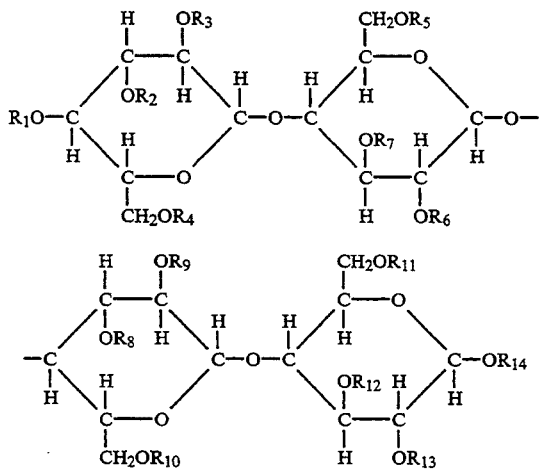

wherein each of $R_1$–$R_{14}$ is independently hydrogen or an acyl group. The term "acyl group" is used in this specification and in the following claims to refer to an organic radical derived from an organic acid by removal of the hydroxyl group (i.e. $R_1CO$— wherein $R_1$ is a hydrocarbon moiety). At least 8, and preferably, at least 10 of $R_1$–$R_{14}$ are acyl groups. Of those acyl groups, at least a majority (i.e. greater than 50 percent), preferably, at least about two-thirds, and most preferably, 90% or all of them are derived from one or more suitable aliphatic polycarboxylic acids, which are described above.

The esters and salts of this invention are useful for preparing coating compositions for providing conductive and highly adherent layers on hydrophobic support materials.

Hydrophobic substrates, such as polyester, polyamide or polystyrene film bases and resin-coated paper supports, are well known commercial materials which possess a number of advantages for many uses. In the photographic industry, for example, such substrates are used as supports for various radiation-sensitive elements. However, the use of such hydrophobic materials in the photographic and other arts has been hampered to some extent because of the difficulty of suitably adhering various other layers to them, particularly when such other layers are hydrophilic in nature.

In order to improve the adhesion of various layers to hydrophobic supports, it is known to apply one or more intermediate layers to the supports before other layers are applied as described, for example, in U.S. Pat. No. 4,123,278 (issued Oct. 31, 1978 to Van Paesschen et al). Such intermediate layers are generally known as "subbing" layers and can include a wide variety of natural or synthetic resinous materials, adhesion promoters and the like.

During the manufacture of radiation-sensitive elements, but prior to applying radiation-sensitive or other hydrophilic layers to a subbed hydrophobic support, the support web itself is subjected to considerable mechanical handling over rollers and other web-guiding means. As a result, a considerable buildup in electrostatic charge occurs on the support web. Because of the insulative nature of the support material, little of this charge is dissipated by the time it reaches subsequent coating operations. Consequently, such electrostatic charge often interferes with coating operations and causes nonuniformities, streaks and other defects in the applied coatings. Further, during the coating of radiation-sensitive materials, the electrostatic charge often arcs or discharges thereby "fogging" the radiation-sensitive layers. Fogging shows up as small white dots in any image provided in such layers.

Attempts have been made to prevent or reduce electrostatic charge buildup either by making the support conductive or by coating the support with conductive compositions as noted, for example, in U.S. Pat. No. 1,981,425 (issued Nov. 20, 1934 to McNally) and in the Van Paesschen et al patent mentioned hereinabove.

However, such attempts have had limited success. While reducing electrostatic charge buildup to some extent, known conductive layers generally exhibit limited conductivity thereby reducing such buildup to an insufficient degree. Other conductive layers exhibit inadequate adhesion to hydrophobic supports. In particular, it has been difficult for workers in the photographic art to find coating compositions which, when coated and dried, will prevent or reduce electrostatic charge buildup. It has also been difficult to find coating compositions for use in forming conductive layers which readily adhere to hydrophobic supports.

The invention described in U.S. Pat. No. 4,459,352 relates to coating compositions that overcome problems encountered with previously known compositions. The esters and salts of this invention are useful in providing an improvement over the invention of U.S. Pat. No. 4,459,352.

Thus the present invention relates to materials for providing an improved aqueous coating composition which, when coated onto a support and dried, further overcomes aforementioned problems encountered with known conductive coating compositions. Most notably, this novel coating composition can be used to provide a conductive layer which effectively reduces or eliminates electrostatic charge buildup which often occurs during manufacturing operations. Further, this subbing layer exhibits excellent adhesion to both hydrophobic support materials and subsequently coated hydrophilic layers. The coating compositions made from esters and salts provided by this invention are also useful for providing water-insoluble and conductive pelloid layers on hydrophobic support materials. Pelloid layers are also known as anti-curl layers.

Thus esters, salts and mixtures thereof provided by this invention are useful as components in an aqueous coating composition, which is capable of forming a conductive and highly-adherent layer on a support, comprises (a) a hydrophilic binder; (b) an ester of cellulose having at least 8 acyl groups per $C_{24}$ cellulose unit wherein at least a majority of the acyl groups are derived from an aliphatic polycarboxylic acid having from 3 to 6 carbon atoms; or a salt of that ester; and optionally, (c) a hardening agent in an amount sufficient to render the layer water-insoluble after coating and drying of the coating composition.

This invention also provides materials to prepare a composite base comprising a support having on at least one side thereof a water-insoluble, conductive and highly-adherent layer composed of the components (a), (b) and optionally (c) described hereinabove.

Further, this invention provides materials to prepare a composite element comprising a support and on at least one side thereof, a hydrophilic layer. This layer is adhered to the support with a conductive and highly-adherent subbing layer composed of:
(a) a hydrophilic binder;

(b) an ester of cellulose having at least 8 acyl groups per $C_{24}$ cellulose unit wherein at least a majority of the acyl groups are derived from an aliphatic polycarboxylic acid having from 3 to 6 carbon atoms; or a salt of the ester; and optionally (c) a hardening agent in an amount sufficient to render the subbing layer water-insoluble after coating and drying.

In the following description of experimental results, "DACA" is used as an acronym to describe deacetylated cellulose acetate. In some instances, "DACA-1" is used to describe a deacetylated cellulose acetate made by a procedure in which the deacetylation was conducted using aqueous ammonia as the deacetylating agent. In other instances "DACA-2" is used to designate a deacetylated cellulose acetate made using an alcohol and alkali metal alkoxide (e.g. $CH_3OH$ and $NaOCH_3$) as the deacetylating agent. Esters and salts of this invention are made from a DACA-2.

EXAMPLE 1

Preparation of a Deacetylated Cellulose Acetate

In a 5 liter 3 neck flask equipped with stirrer and reflux condenser, were placed 500 grams of cellulose acetate, 1500 grams of methanol and 30 grams of a 25% solution of sodium methoxide in methanol. The flask is heated in a 72° C. constant temperature bath and the contents refluxed with vigorous stirring for 4 hours. After 4 hours, the contents are cooled, filtered, washed with 2×200 grams of methanol and dried for 16 hours at 40° C. under vacuum. Analysis shows less than 2% of the acetyl groups remaining.

EXAMPLE 2

Preparation of a Deacetylated Cellulose Acetate

To a stirred and heated reactor equipped with a reflux condenser, add 5 parts by weight methanol. Add 1.66 parts Eastman grade CA398-3 cellulose acetate (number average molecular weight is 27,000). Add 0.1 part sodium methoxide. Heat to about 65° C. and reflux for 4 hours. Cool to 20° C. Isolate the slurry of cellulose on a buchner funnel or filtering centrifuge. Rinse the filter cake with 2.2 parts of fresh methanol. Dry at 40° C. under vacuum. The yield is 1 part DACA-2 by weight. Volatiles are less than 3%. Residual acetyl content is less than 3% by weight. Inherent viscosity in iron sodium tartrate solution is between 0.9 and 1.2 dL/g (measured at 0.5% weight per volume).

EXAMPLE 3

Preparation of Trihydrogen Cellulose Trisuccinate (HCS)

To a dry, heated and stirred reactor, add 4.3 parts by weight glacial acetic acid. Add 0.97 parts succinic anhydride. Add 0.35 parts DACA-2 prepared as in Example 2. Add 0.54 parts potassium acetate. Neat the slurry to 85° C. and hold for 8 hours. During the first 30 minutes the viscosity will increase sharply, but within 45 minutes the substitution will have proceeded far enough that the HCS will begin to dissolve in the acetic acid and viscosity will diminish. To the still hot reactor after 8 hours, add 1.23 parts demineralized water and then cool reactor to 20° C. Precipitate the polymer dope in 44 parts cold water containing 0.027 parts sodium hypochlorite and 0.11 parts of 36% hydrochloric acid. Using decantation washes, the HCS is washed 5 times with 44 parts of demineralized water in each wash. The HCS is isolated on a buchner funnel or filtering centrifuge and dried at 40° C. under vacuum. The theoretical yield is one part HCS at 3 out of a possible 3 succinyl substitutions on each glucose repeating unit. Volatiles are less than 2%. Residual succinic acid is less than 1% by weight. Succinyl substitution is at least 57.7% by weight (2.16 moles out of a possible 3) and is typically 63% (2.7 moles out of 3>. Inherent viscosity in 1N sodium acetate in acetic acid is 0.7 to 1.0 dL/g (0.5% weight per volume>.

When a cellulose having an appreciably higher molecular weight, e.g. about 30,000 is employed, one preferably uses a reaction vessel with high torque stirring sufficient to agitate the viscous reaction mixture containing the cellulose.

EXAMPLE 4

Preparation of Tripotassium Cellulose Trisuccinate (KCS)

To a stirred and cooled tank, add 5.9 parts by weight of demineralized water. Add 1 part dry HCS. Over 2 hours, meter 13.4 parts of a 2.7% by weight potassium hydroxide solution in water into the HCS slurry. Keep the HCS temperature below 30° C. The major portion of dissolution and reaction to KCS will have occurred by the end of the potassium hydroxide addition. Stir the solution overnight to complete the reaction. Adjust the pH to between 6.6 and 7.2 with potassium hydroxide. Filter the solution through a 50 micron filter. Solids will be between 5.5% and 6.5% by weight. The solution viscosity at 25° C. and 5.5% solids is between 5 and 25 centipoise.

COMPARATIVE EXAMPLE

Deacetylation of Cellulose Acetate Using Ammonium Hydroxide and Subsequent Preparation of HCS and KCS A mixture is prepared using 100 g of cellulose acetate having a degree of polymerization of 75-130, and a number average molecular weight of 20,000 to 35,000; 500 g of $H_2O$, and 500 g of concentrated aqueous ammonia. The mixture is allowed to stand for 48 hours and then washed three times with 2000 g of $H_2O$ and then dewatered three times using 500 g of glacial acetic acid. The deacetylated cellulose acetate is at a concentration of about 26% in acetic acid.

Deacetylated product (164 g) prepared as above, is introduced with 175 g of succinic anhydride, 583.5 g of glacial acetic acid and 65 g of potassium acetate catalyst into a 2000 ml, 3-neck flask equipped with a stirrer, reflux condenser and a thermometer. The resultant mixture (28.6% solids) is reacted for 20 hours at 92% C. The succinic acid half ester of cellulose product thereby produced is recovered by precipitation in water. The product is then water washed and dried at 65° C.

The succinic acid ester product prepared as above is converted into a potassium salt as follows: 10.5 g Of the cellulose succinate is slurried in 63 g of $H_2O$ and stirred rapidly. While stirring 136.5 g of 0.5N KOH is added slowly.

Following the general procedure given above, a sample of potassium cellulose succinate was prepared using as a starting material a cellulose acetate having a degree of polymerization of 100 and a weight average molecular weight of 27,000. The sample was used as the comparison material in the tests reported below.

Differences in HCS and KCS When Using the Preferred (Nonaqueous) DACA-2 Instead of the (Aqueous) DACA-1

In the HCS reaction, the use of DACA-2 made by a non-aqueous route allows a 48% reduction in the amount of succinic anhydride required. A 7° C. (92° C. to 85° C.) reduction in reaction temperature and a 12 hour (20 to 8) reduction in reaction time is realized. The reaction mass is easily stirred throughout the reaction compared to the extremely difficult to stir reaction with DACA-1. Aqueous prepared DACA-1 will not react to completion using the HCS procedure described in Example 3. The final HCS from DACA-2 has a lower inherent viscosity compared to HCS from aqueous DACA, and it is completely soluble in 80° C. water which HCS from aqueous DACA is not. The color of the HCS is significantly improved.

When starting with DACA-2, the dissolution of the KCS is faster and much more complete with an easy filtration of the final solution. The final KCS solution viscosity is about 20 centipoise compared to about 70 centipoise for KCS made from aqueous DACA.

COMPARATIVE RESULTS

Three batches of KCS made from DACA-2 were obtained. Using the DACA-1 procedure, (see Comparative Example) two batches of KCS were made. The percent solids and viscosity of each batch were measured. Using each batch of KCS in a statistically designed experiment, KCS/gel formulations were made at varying ratios and coated at different coverages with wire wound rods on ESTAR polyester film support and dried at 260° F. Randomized coatings were made with the center point formula coated four times. The surface resistivity of each coating was measured at 50% RH.

Results and Discussion

Table 1 lists the % solids and viscosities of the five batches of KCS that were investigated. The data show that one batch (Batch 2) has a lower % solids (5.2 vs 6) and, hence, has the lowest viscosity. The data also show that the KCS made from DACA-2 have lower viscosities than the KCS made from DACA-1 which is advantageous in coating from a skim pan-air knife hopper. The lower reactivity of the DACA-1 requires a longer esterification time, hence, the more possibility for transesterification and higher solution viscosity.

Table 2 lists the surface resistivities of the coatings of the five batches of KCS at 50% RH in ohms/sq.$\times 10$ exp 10. Excellent reproducibility of the resistivity values is seen in the center point formula (1:1KCS/gel). The data also show the higher the KCS/gel ratio or the higher total coverage the lower the surface resistivity. The key point in the resistivity data is the 1 to 1.5 decade increase in conductivity of the KCS/gel coatings made from the DACA-2 synthesis versus the DACA-1 synthesis.

The lower viscosity and increased conductivity of KCS made by the DACA-2 synthesis allows reduction of the KCS/gel ratio from 4/1 to 1/1, thereby reducing the cost of a subbing layer while maintaining excellent coatability and a surface resistivity well within the specifications of 10 exp 8 to 10 exp 10 ohms/sq. at 50% RH.

TABLE 1

| | KCS Solutions made from | | | | |
|---|---|---|---|---|---|
| | DACA 2 | | | DACA 1 | DACA 1 |
| Batch: | 1 | 2 | 3 | A | B |
| % Solids | 6.2 | 5.2 | 5.9 | 6.1 | 6.2 |
| Viscosity cps | 22.6 | 12.1 | 17.4 | 76.6 | 33.3 |

TABLE 2

| | DACA 1 vs. DACA 2 KCS Resistivity | | | | | | |
|---|---|---|---|---|---|---|---|
| KCS/Gel | Coverage mg/sq. ft. | | | Rs 50% RH ohmns/sq $\times$ 10 exp 10 | | | |
| Ratio | Total | KCS | Gel | Batch 1 | Batch 2 | Batch 3 | Batch A/B |
| 1.50:1 | 12.0 | 4.80 | 7.20 | 0.02 | 0.03 | 0.007 | 0.08/0.03 |
| 1.50:1 | 4.0 | 1.60 | 2.40 | 0.02 | 0.07 | 0.50 | 0.50/0.60 |
| 0.50:1 | 12.0 | 8.00 | 4.00 | 11.0 | 3.30 | 2.30 | 80.6/18.2 |
| 0.50:1 | 4.0 | 2.67 | 1.33 | 7.50 | 35.7 | 56.0 | 122/1.6 |
| 1.00:1 | 8.0 | 4.00 | 4.00 | 0.30 | 0.10 | 0.07 | 15.2/19.2 |
| 1.00:1 | 8.0 | 4.00 | 4.00 | 0.20 | 0.10 | 0.90 | 8.9/7.5 |
| 1.00 | 8.0 | 4.00 | 4.00 | 0.10 | 0.20 | 0.50 | 9.8/5.6 |
| 1.00 | 8.0 | 4.00 | 4.00 | 0.50 | 0.20 | 0.03 | 35.7/6.0 |
| 1.71:1 | 8.0 | 2.96 | 5.04 | 0.03 | 0.03 | 0.04 | 0.23/1.1 |
| 1.29:1 | 8.0 | 6.19 | 1.81 | 269.0 | 21.7 | 170.0 | 1000/22.7 |
| 1.00:1 | 13.7 | 6.83 | 6.83 | 0.10 | 0.02 | 0.01 | 0.6/0.6 |
| 1.00:1 | 2.3 | 1.17 | 1.17 | 0.30 | 2.30 | 0.90 | 125/200 |
| 1.00:1 | 9.0 | 4.50 | 4.50 | 0.20 | 0.10 | 1.3 | 1.2/1.6 |
| 1.0:1 | 7.0 | 3.50 | 3.50 | 0.20 | 0.20 | 1.4 | 12.4/2.5 |
| 1.25:1 | 8.0 | 3.56 | 4.44 | 0.20 | 0.03 | 0.30 | 6.3/3.6 |
| 0.75:1 | 8.0 | 4.57 | 3.43 | 2.0 | 1.3 | 0.40 | 67/32 |

The invention has been described and illustrated above with particular reference to preferred embodiments. A skilled practitioner, familiar with Applicant's detailed description can make many substitutions or modifications without departing from the scope and spirit of the appended claims which appear below.

I claim:

1. A method of making a lithium, sodium potassium or ammonium salt of cellulose succinate having at least about 8 acyl groups per $C_{24}$ cellulose unit and an inherent viscosity of from about 0.7 to about 1.0 dL/g measured at 0.5% weight per volume in IN sodium acetate in glacial acetic acid at 25° C. which comprises deacylating 90% or more of the acetyl groups of cellulose acetate with methanol or ethanol in the presence of an alkali metal alkoxide catalyst to form cellulose having a weight average molecular weight of from about 12,000 to about 30,000, reacting the cellulose with succinic acid or succinic anhydride to form cellulose succinate and reacting the cellulose succinate with lithium, sodium, potassium or ammonium hydroxide.

2. The method of claim 1 wherein potassium hydroxide is employed.

3. The method of claim 1 wherein the alcohol employed in the deacyation of cellulose acetate is methanol.

4. The method of claim 1 wherein the alkali metal alkoxide catalyst is sodium methoxide.

5. The method of claim 1 wherein all of the acetyl groups of the cellulose acetate are deacylated.

* * * * *